United States Patent [19]

Tarter

[11] Patent Number: 4,705,146

[45] Date of Patent: Nov. 10, 1987

[54] DISC BRAKE

[75] Inventor: James H. Tarter, Troy, Mich.

[73] Assignee: Allied Corporation, Morristown, N.J.

[21] Appl. No.: 596,176

[22] Filed: Apr. 2, 1984

[51] Int. Cl.[4] ............................................. F16F 69/04
[52] U.S. Cl. ...................................... 188/73.1; 73/579; 181/208; 188/218 A
[58] Field of Search ................. 188/73.1, 73.31, 73.36, 188/73.37, 73.43, 73.44, 250 B, 250 E, 250 G, 72.4, 73.42, 1.11, 218 A, 218 XL; 181/209, 208, 207; 73/579

[56] References Cited

U.S. PATENT DOCUMENTS

| | | | |
|---|---|---|---|
| 2,532,086 | 11/1950 | Chapman et al. | 188/218 A |
| 2,690,820 | 10/1954 | Raes | 188/250 G |
| 2,971,611 | 2/1961 | Gage | 188/72.4 X |
| 3,166,157 | 1/1965 | Burnett | 188/73 |
| 3,166,158 | 1/1965 | Burnett et al. | 188/73 |
| 3,184,005 | 5/1965 | Thirion | 188/73 |
| 3,395,780 | 8/1968 | Swift | 188/73 |
| 3,422,935 | 1/1969 | House | 188/73.43 |
| 3,566,995 | 3/1971 | Anders | 188/250 B X |
| 3,603,434 | 9/1971 | Leroux | 188/73.32 |
| 3,942,611 | 3/1976 | Burnett et al. | 188/73.3 |
| 4,003,451 | 1/1977 | Torok | 188/250 B X |
| 4,121,699 | 6/1977 | Tsuruta et al. | 188/73.3 |
| 4,189,032 | 2/1980 | Farr | 188/73.3 |
| 4,220,223 | 9/1980 | Rinker et al. | 188/250 B X |
| 4,266,633 | 5/1981 | Barabino et al. | 188/1.11 |
| 4,379,501 | 4/1983 | Hagiwara et al. | 188/218 A X |
| 4,393,960 | 7/1983 | Mazur et al. | 188/250 E X |
| 4,501,347 | 1/1985 | Cerny et al. | 188/250 G |

FOREIGN PATENT DOCUMENTS

| | | |
|---|---|---|
| 30502 | 6/1981 | European Pat. Off. . |
| 59128 | 1/1982 | European Pat. Off. . |
| 0080950 | 8/1983 | European Pat. Off. . |
| 163011 | 4/1985 | European Pat. Off. . |
| 1145864 | 3/1956 | France . |
| 1535085 | 6/1967 | France . |
| 2176357 | 10/1973 | France . |
| 2252035 | 11/1973 | France . |
| 2222571 | 3/1974 | France . |
| 2305641 | 10/1976 | France ................. 188/73.1 |
| 2312690 | 12/1976 | France ................. 188/250 E |
| 2422863 | 4/1978 | France . |
| 2416394 | 8/1979 | France . |
| 2500096 | 2/1981 | France . |
| 679845 | 1/1965 | Italy . |
| 134531 | 10/1980 | Japan ................. 188/250 E |
| 1044229 | 9/1966 | United Kingdom . |
| 1066442 | 4/1967 | United Kingdom . |
| 2028932 | 12/1980 | United Kingdom . |

OTHER PUBLICATIONS

Railway System Controls Magazine, Nov. 1972, pp. 14-20.
Vibration Notebook Jan. 1962, vol. B, No. 1, p. 2.
Proceedings of the Automobile Division, the Institution of Mechanical Engineers, No. 1, 1961/1962, pp. 33-40, R. T. Spurr: "A Theory of Brake Squeal".

Primary Examiner—Duane A. Reger
Attorney, Agent, or Firm—Leo H. McCormick, Jr.; Ken C. Decker

[57] ABSTRACT

A disc brake (10) having friction pads (42) and (44) whose arcuate foot prints (80, 82, 84) on a rotor (12) is les than a nodal diameter of a frequency that would create an undesirable noise during a brake application.

5 Claims, 8 Drawing Figures

DISC BRAKE

This invention relates to a disc brake having first and second pads whose surface area that engage a rotor has an arcuate length that is less than that would excite certain nodes of vibration of the rotor to substantially eliminate the creation of undesirable noise.

Noise generated during a brake application has been increasing as the size of vehicles has been decreasing. Attempts have been made to mask the noise through the use of sound adsorption coatings such as disclosed in U.S. Pat. No. 3,998,301 to the back side of a friction pad. While such coatings are effective, the addition of the coating adds cost to the manufacture and at times because the thickness of the coating has not been uniform or did not cover the entire back side of a pad, undesirable noise did occur.

In order to eliminate the coating, it was suggested in U.S. Pat. No. 4,154,322 to place a screen on the back side of the pad to absorb noise. This solution has not received customer acceptance since it too adds cost to the brake lining without providing any increase in braking efficiency.

Another attempt to reduce noise was the addition of a wiper member to the friction pad disclosed in U.S. Pat. No. 4,315,563. This patent suggested that the creation of oxides on a rotor during a brake application effected the development of the coefficient of friction in such a manner that noise was created during a later brake application. Since the wiper member is of a different material than the remainder of the friction material in the pad, it results in a more costly brake pad.

Individual noise problems have been reduced through the modification of the ingredients in the composition of material that make up a brake pad. While the modification of the friction material for noise abatement is satisfactory most customers and suppliers do not have the time and monies to solve this problem for each application.

It was suggested that there was a difference in the creation of noise on the same type vehicle using the same friction material when different rotors (solid vs. open center) were used. A general opinion was that brake squeal or noise is influenced by the excitation of the natural frequencies of a rotor caused by the rubbing of friction pads on a rotor surface.

From experimentation I was able to determine that a disc brake rotor may have fifteen or more natural frequencies. Most of these are in the axial direction but some are in the torsional direction. However, when a brake was engaged with the rotor to simulate a brake application only certain of these natural frequencies create brake noise or squeal. Since every natural frequency of a vibrating system has associated with it a mode shape which describes the pattern of deformation associated with that natural frequency it was decided to investigate the mode shape of a disc brake and associated rotor. In a continuous structure, the mode shape is generally accepted or described by defining the pattern of nodes (loci of points of zero deformation) on the surface of the structure. A disc brake rotor resembles an annular circular plate with a free edge and a clamped edge. From previous experiments it was found that the mode shape of an annular circular plate consists of nodal circles and diameters of all possible combinations. The rotor was excited to its natural frequencies and the nodal diameters of the nodes were counted. Since only certain natural frequencies cause brake squeal it was determined to evaluate that frequency most likely to produce noise when mated with a brake pad. It is known that a resonant system is more sensitive to vibration that is less than its natural frequency than it is to vibration greater than its natural frequency. Hence low frequency axial vibrations are more prone to excite the torsional vibrations. Thus a beneficial effect on brake noise should be attained if the friction pad surface is decreased since higher and higher axial nodes would be created with such a reduction which are less likely to excite torsional nodes. However an objection to a decrease in the friction pad surface is that wear is increased. Therefore, I concluded that a compromise in reduction of the pad surface was justified since the ability to hear squeals decreases as the frequency increases. Therefore, I determined that the surface area that engages a rotor should have an arcuate length which is different from the nodes for the lower frequency axial nodes that can create undesirable noise during a brake application.

An advantage of this invention occurs through the selection of the size of a friction surface that engages a rotor to substantially eliminate undesirable noise created during a brake application.

It is an object of this invention to provide a disc brake with friction pads that have operational friction surfaces that are offset from each other to engage a rotor within different operating nodal diameters to substantially reduce the creation of noise during a brake application.

The invention will now be described with reference to the accompanying drawings wherein:

FIG. 3 is a table illustrating the measured natural frequency of the rotor of the disc brake of FIG. 1;

FIG. 4 is a schematic illustration of the surface pattern produced by the engagement of the friction pads of the disc brake of FIG. 1 with a rotor;

FIG. 6 is a schematic illustration of the surface pattern produced by the engagement of the friction pads of the disc brake of FIG. 5 with a rotor;

Figure 1:
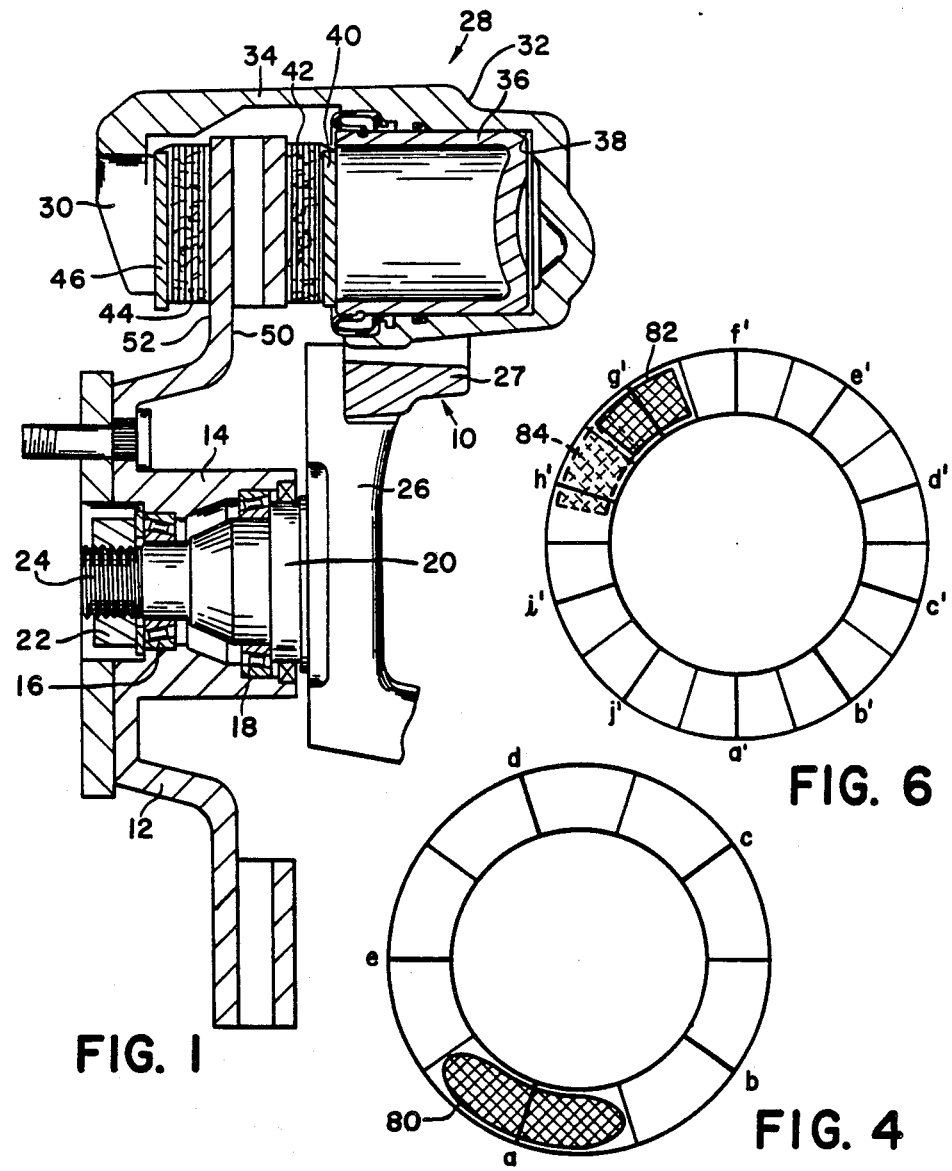
FIG. 1 is a sectional view of a disc brake.
Figure 2:
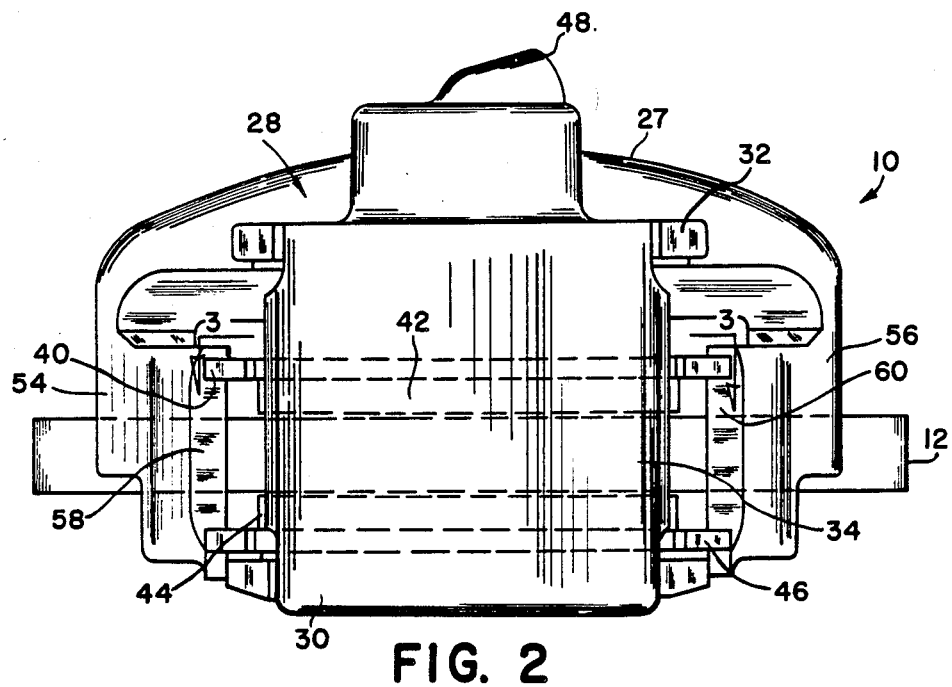
FIG. 2 is a top view of the disc brake of FIG. 1.

The disc brake 10 as best shown in FIGS. 1 and 2 includes a rotor 12 with a hub 14 that is carried on bearings 16 and 18 on shaft or axle 20. A nut 22 is mated with threads 24 to hold rotor 12 on axle 20 which is fixed to the frame or other support 26 of a vehicle. A generally C-shaped caliper 28 which surrounds rotor 12 is secured to support 26 by an anchor plate 27. Caliper has a front or outboard leg 30 and a rear or inboard leg 32 interconnected by a bridge portion 34. The inboard caliper leg 32 contains a hydraulic actuation piston 36 which is located in bore 38 connected to a source of operational fluid. Piston 36 engages backing plate 40 of the inboard friction pad 42. An indirectly actuated outboard friction pad 44 has its backing plate 46 connected to outboard leg 30. When hydraulic fluid is supplied to bore 38 through inlet port 48, piston 36 moves inboard pad 42 into engagement witn face 50 on rotor 12 whereupon caliper 28 slides on pins to move backing Plate 46 toward rotor 12 causing outboard pad 44 to engage face 52 on rotor 12.

Anchor plate 27 has two axially and outward extending arms 54 and 56, see FIG. 2, which extend over the periphery of the rotor 12 and slidably support both the backing plate 40 for the inward friction pad 42 and backing plate 46 for the outward friction pad 44 on guide rails 58 and 60. In this arrangement all braking friction torque is directly transferred by anchor plate 27 into support 26. Thus, the caliper 28 primarily serves as the structure for applying the necessary clamping forces to effect a brake application without carrying braking torque. During braking this type of brake exhibited squeal or noise at various deceleration rates.

In order to evaluate the noise created during braking, experiments were performed to establish the frequency at which this brake has a tendency to squeal. The basic process is to excite the rotor 12 either by striking with an instrumented hammer or vibrating it with an electromagnetic shaker having a random or swept sine input. An accelerometer was mounted at various positions on the rotor 12 while it was excited in a uniform manner at a single point. The transfer of motion between the input to the output was recorded for a series of tests. The transfer function is a complex function having both a real and imaginary component. At a given location on the rotor 12, the imaginary part of the transfer function will display a series of peaks which can be either positive or negative. Each peak corresponds to a resonant frequency. If, at a given resonant frequency, the imaginary part of the transfer function changes sign between two adjacent locations, then there is a node between these locations. The exact position of the node may be defined by the relative magnitudes of the peaks.

A Fast Fourier Transform Analyzer was employed to perform the calculations, just described, automatically and display a pictorial representation of the mode shape.

Tests were performed for both axial and tangential vibrations of the rotor 12. The nodes were in the form of diameters and circles. FIG. 3 shows the natural frequencies corresponding to modes having nodal diameters only.

The axial mode corresponding to five nodal diameters and the two torsional modes corresponded to the most frequently observed squeals with the disc brake 10 using this rotor 12. The fact that the torsional modes are excited is not surprising, since that is the direction that the frictional force is applied to the rotor.

Figure 5:
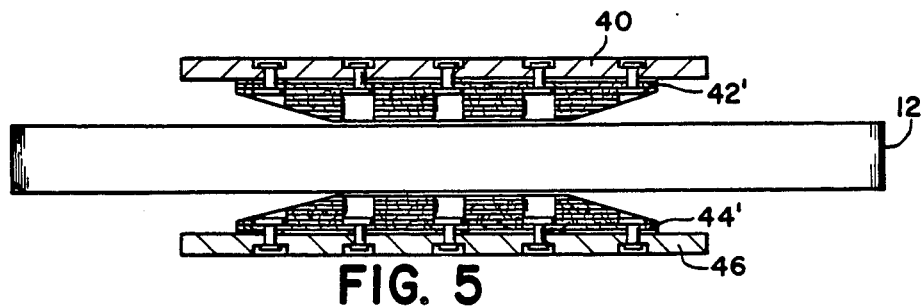
FIG. 5 is a sectional view of friction pads made according to the principles of this invention and their relationship with a rotor.

FIG. 4 shows the geometrical correlation that exists between the footprint 80 of the friction pads 42 and 44, respectively, and the mode shape corresponding to five nodal diameters (a-e) and a natural frequency of 7000 hertz. It can be seen that the footprints 80 of the friction pads 42 and 44 are the same as shown in FIG. 4. The footprints subtend an angle equal to that subtended by a whole number of adjacent nodal diameters, in this case, three. In order to determine if this geometrical relationship is indicative of a real physical effect, or is merely fortuitous, a set of friction pads 42' and 44', shown in FIG. 5, which had previously squealed at frequencies of 2 to 15 kHz with a median frequency of 7 kHz were beveled on both sides to reduce the footprint of the pad on the rotor to 50% of its original value. When retested using these pads, the brake squealed at 17 to 18 kHz with a median frequency of 17 kHz. FIG. 6 shows that the footprints of beveled pads 42' and 44'. Footprints 82 subtends an angle subtended by three whole adjacent nodal diameters, for the mode having a total of ten nodal diameters a'-j', corresponding to a natural frequency of 16.5 kHz.

These experimental results indicated correlation exists between the footprint of the friction pads 42 and 44 on the rotor 12 and the axial mode of rotor vibration that is excited by the pads 42 and 44. Exciting an axial mode of rotor vibration can potentially excite any torsional modes of rotor vibration. However, elementary vibration theory shows that a resonant system is more sensitive to vibration that is less than its natural frequency rather than greater than its natural frequency. Hence, if a higher frequency axial mode is excited, it becomes less likely that lower frequency torsional modes would be excited. Since the ability of the total human population to hear squeals drops off as the frequency increases, sufficiently high frequencies that produce a brake squeal can be disregarded. Thus brake squeal complaints can be expected to decrease as squeal frequency increases. The above test indicated a beneficial effect on brake squeal by decreasing the friction pad footprint since higher and higher axial modes are excited as it decreases, which in turn decreases the possibility of exciting torsional modes.

There is, however, a serious objection to gross reductions in friction pad area, namely that wear is substantially increased. What is wanted is a method of obtaining the helpful effect of area reduction, while keeping the actual surface area as large as possible.

Figure 7:
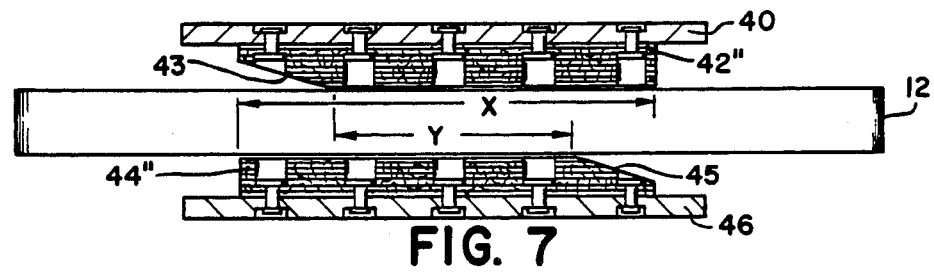
FIG. 7 is a sectional view of another embodiment of a rotor and friction pad arrangement made according to the principles of this invention.

In order to increase the total area for each brake pad and still have the common area "y" on rotor 12 remain within a desired nodal diameter, the embodiment shown in FIG. 7 was evaluated. Friction pads 42" and 44" were obtained and tested for noise. Squeals were observed when the operating frequency was between 5000 to 20,000 hertz with a median of about 13,000 hertz. Thereafter, beveled ends 43 and 45 were placed on pads 42" and 44" and retested with the same rotor 12. During this subsequent test, squeals were at 12,000 to 20,000 hertz with a median of about 18,000 hertz. These test results are consistent with the noise level found for the embodiment shown in FIG. 5 since the common swept area "y" is the same. However, the effective swept area is increased to "x". Unfortunately as the friction pads 42" and 44" wear, because of the beveled ends the common swept area approaches the effective swept area as y approaches x and the noise level also increase. Under some circumstances this lowering of the noise level would be acceptable to provide an operator with an indication that the friction pads 42" and 44" need to be replaced.

Figure 8:
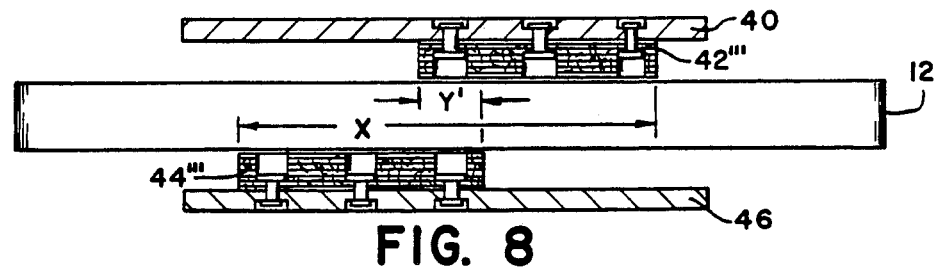
FIG. 8 is a sectional view of a further embodiment of a rotor and friction pad arrangement made according to the principles of this invention.

Friction pads 42" and 44" shown in FIG. 8 are offset from each other and both the common y' and effective x' areas remain the same during the entire wear cycle since the ends are square and not beveled. In this embodiment, the overlap or common area y" is of such length that each friction pad 42" and 44" essentially operate in different nodal diameters of the rotor 12 as illustrated by phantom pad footprint 84 and footprint 82 shown in FIG. 6.

It is my conclusion that the smaller the combined footprint of a set of friction pads on a rotor, the higher the rotor axial natural frequency that will be excited by the friction pads. In addition, the higher the axial natural frequency that is excited, the less likely that torsional modes at a lower natural frequency will be created during a brake application. As long as the common swept area of the pads on a rotor excite an undesirably low axial frequency made of vibration, the brakes can make noise which may be offensive to an operator.

We claim:

1. In a disc brake having a caliper member for urging first and second pads into engagement with a rotor to effect a brake application, said rotor having a pattern of nodes corresponding to a natural frequency associated with an oscillation condition, characterized by said first and second pads defining first and second operational areas, respectively, that are offset each other and engage opposite surfaces on said rotor, said first and second operational areas having an arcuate length which is less than an arcuate length between nodes corresponding to a frequency mode of said rotor which could create undesirable noise during a brake application, said offset preventing said first and second operational area from totally operating in the same nodal diameter to further reduce the development of noise, said arcuate length being more than five but less than ten nodal diameters of said rotor.

2. In the disc brake as recited in claim 1 wherein said pad are further characterized by each pad having a leading edge and a trailing edge, said leading edge on said first pad being beveled to vary said first operational area as said first pad wears during brake applications and said trailing edge on said second pad being beveled to vary said second operational area as said second pad wears during brake applications, said varying of said first and second operational areas creating a controlled noise to inform an operator of a wear condition.

3. In the disc brake as recited in claim 1 wherein said first and second operational areas operate within a frequency of a nodal diameter created by an axial frequency that is greater than the lowest torsional frequency in the range of human hearing, said frequency being above 7000 kHz.

4. A method of selecting a disc brake pad for use with a caliper member having a piston that urges the brake pad into engagement with a rotor, comprising the steps of:

exciting a rotor to develop resonant frequencies therein;

measuring the resonant frequencies of the rotor to determine the natural frequencies corresponding to modes having nodal diameter; and choosing the accurate length of the brake pad as a function of the whole nodal diameter associated with an axial frequency above 7000 kHz.

5. In the method as recited in claim 4 wherein the step of choosing the arcuate length of the brake pad, the highest nodal diameter is selected to be between five and ten nodal diameters of the rotor.

* * * * *